(12) United States Patent
Lessway et al.

(10) Patent No.: US 12,383,998 B2
(45) Date of Patent: Aug. 12, 2025

(54) STEADY REST WITH PREDICTABLE MICRON-SIZED ADJUSTMENT

(71) Applicant: Arobotech Systems, Inc., Madison Heights, MI (US)

(72) Inventors: Richard John Lessway, Bloomfield Hills, MI (US); Shawn Elizabeth Schultz, Fenton, MI (US); Anthony Dean, Madison Heights, MI (US)

(73) Assignee: AROBOTECH SYSTEMS, INC., Madison Heights, MI (US)

( * ) Notice: Subject to any disclaimer, the term of this patent is extended or adjusted under 35 U.S.C. 154(b) by 263 days.

(21) Appl. No.: 17/981,161

(22) Filed: Nov. 4, 2022

(65) Prior Publication Data

US 2023/0271284 A1    Aug. 31, 2023

Related U.S. Application Data

(63) Continuation-in-part of application No. 17/680,891, filed on Feb. 25, 2022.

(51) Int. Cl.
*B23Q 1/76* (2006.01)
*B23Q 3/06* (2006.01)
*B24B 41/06* (2012.01)

(52) U.S. Cl.
CPC .......... *B23Q 1/76* (2013.01); *B23Q 3/06* (2013.01); *B24B 41/065* (2013.01)

(58) Field of Classification Search
CPC .......... B23Q 1/76; B23Q 1/763; B23Q 3/186; B23Q 3/06; B23Q 3/082; B25B 5/064; B25B 5/087; B24B 41/065

USPC ............ 451/408, 406, 244, 407, 402, 49, 51
See application file for complete search history.

(56) References Cited

U.S. PATENT DOCUMENTS

| 3,076,296 | A | 2/1963 | Joyce |
| 8,955,419 | B2 | 2/2015 | Maurer et al. |
| 9,038,510 | B2 | 5/2015 | Maurer et al. |
| 9,114,490 | B1 | 8/2015 | Lessway |
| 9,174,317 | B1 * | 11/2015 | Lessway ................. B23Q 3/06 |
| 10,549,394 | B2 | 2/2020 | Fukui et al. |
| 2003/0077994 | A1 | 4/2003 | Lessway |
| 2012/0260779 | A1 * | 10/2012 | Maurer .................... B23Q 1/76 82/164 |

FOREIGN PATENT DOCUMENTS

CN           208496725 U    2/2019

* cited by examiner

*Primary Examiner* — Makena S Markman
(74) *Attorney, Agent, or Firm* — Brooks Kushman P.C.

(57) ABSTRACT

A steady rest has working and right-hand cover plates and a central plate sandwiched there between. The working cover plate has upper and lower guide tracks and track engagement springs that are received within cavities. The central plate is movably disposed between the working and right-hand cover plates. The central plate slidably engages upper and lower gripping arms that are movable relative to the working cover plate between a clamped position and a retracted position. Tapered rails and rail engagement springs are disposed in a rail recess of the working cover plate. The rails are movable relative to each other to finely and precisely adjust a position at which the workpiece is clamped and moved horizontally or vertically when the gripping arms are in the clamped position. The track and rail engagement springs share common mechanical properties for ready interchange, thereby alleviating inventory concerns.

13 Claims, 8 Drawing Sheets

VERTICAL ADJUSTMENT

HORIZONTAL ADJUSTMENT

STEADY REST WITH PREDICTABLE MICRON-SIZED ADJUSTMENT

CROSS-REFERENCE TO RELATED APPLICATION

This application claims the benefit of and is a continuation-in-part of U.S. Ser. No. 17/680,891, filed on Feb. 25, 2022, now U.S. Pat. No. 12,350,784 issued Jul. 8, 2025, which is incorporated by reference herein.

TECHNICAL FIELD

The present disclosure relates to a finely adjustable steady rest system for positioning a workpiece that is rotationally symmetrical.

BACKGROUND

An adjustable steady rest system is commonly used for securing a workpiece during machining operations such as but not limited to grinding, turning, milling, and boring. In such systems, gripping arms secure the workpiece while a cutting tool, such as an abrasive wheel, blade, or bit removes material from the workpiece. Known steady rests have a mechanism for adjusting the position or location of the gripping arms and thus the workpiece to enhance the accuracy of the machining operations.

Today's machines often demand high tolerances. Such challenges are often presented in high production volumes. Desirably, adverse workpiece conditions such as out-of-roundness and lobing should be avoided.

End users expect adjustment mechanisms to be accurate, capable of fine adjustment, repeatable, and reliable. Reducing the number of parts, particularly the number of moving parts, is advantageous. This may increase the reliability of the mechanism and reduce the likelihood of moving parts coming into contact with contaminants. Furthermore, reducing the number of parts may reduce tool manufacturing costs and complexity.

Against this background, it would be desirable to offer a refined adjustment system that enables a higher precision in repeatable adjustment with a minimal number of parts that are required to bring about such an adjustment.

Ideally, such a system would be designed to facilitate the task of repairing with minimal downtime.

Such adjustment mechanisms have a number of parts that should ideally cooperate so that none of them stick or unnecessarily interfere with each other when guided movement is called for in the adjustment process. It would be desirable to anticipate the potential for such unwanted interference by providing ameliorating design changes. For example, it would be desirable to eliminate any potential for a spring to become "pinched" between adjacent parts of the adjustment mechanism. Another example relates to situations where a part receives another moving part. Ideally, the interface between the two parts should be contoured so that there is no unwanted binding interference therebetween. Such factors assume importance when the two parts cooperate under the influence of high-engagement forces.

To facilitate replacement and repair, it would be helpful to have all springs in an adjustment mechanism with the same dimensions and share common mechanical properties so that they can be readily interchangeable.

Ideally, the springs should not be exposed to unnecessary compression in a single or repeated use because such exposure may lead to a spring losing at least some of its rebounding properties.

Thus, it would be desirable to have a mechanism that would permit a more precise adjustment system that accommodates design criteria such as those described above.

Among the references considered in preparing this application are U.S. Pat. Nos. 9,174,317, and 8,955,419. Those references are incorporated here by reference, to the extent that they are not inconsistent with the disclosure herein.

SUMMARY

Several embodiments of the disclosed steady rest adjustment mechanisms have a number of parts that cooperate so that none of them stick or unnecessarily interfere with each other when guided movement is called for in the adjustment process. In such embodiments, any potential for a spring to become "pinched" between adjacent parts of the adjustment mechanism is eliminated.

The present disclosure also addresses situations where a part receives another moving part. So that there is no unwanted binding interference therebetween, mating surfaces that define the interface between the two parts are contoured. Such factors assume importance when the two parts cooperate under the influence of high-engagement forces.

In one embodiment, the present disclosure provides a steady rest system for precisely locating a workpiece that is rotated and subjected to forces exerted by one or more machine tools in a direction inclined (e.g., orthogonal) to an axis of workpiece rotation. One steady rest has a working cover plate (as further described below) and a right-hand cover plate (when viewed from the rear). Between these plates is a central plate (which moves in parallel with an X- or horizontal axis). The working cover plate has a pair of recesses that receive two guide tracks which ultimately influence and enable finely tuned displacement of upper and lower gripping arms that secure and displace a workpiece.

Within the guide tracks, roller guides move in a defined, precise and predictable manner.

The central plate slidably engages the upper and lower gripping arms. The gripping arms are movable between a closed clamped position and an open retracted position to releasably secure the workpiece. In the closed clamped position, the workpiece can be minutely re-positioned horizontally and vertically.

Fine, predictable, and precise horizontal and vertical adjustments of the gripped workpiece are enabled.

BRIEF DESCRIPTION OF THE DRAWINGS

The drawings described herein are for illustrative purposes of selected embodiments and not all possible implementations. They are not intended to limit the scope of the present disclosure.

FIG. 3B is a vertical, sectional view of the steady rest system with the right-hand cover plate removed;

In FIG. 8A the relationship between the rail pin 155 and vertical rail 58 or horizontal rail 60 would allow a condition in which the rail engagement spring 90 could become seized in the rail spring pocket 157. To solve this condition, a rail washer 156 is added (FIG. 8B). This eliminates the rail spring pocket 157 and changes the relationship between the rail pin 155 and vertical rail 58 or horizontal rail 60. Additionally, springs 104 are now characterized by a higher spring force.

Corresponding reference numerals indicate corresponding parts throughout the several drawings.

DETAILED DESCRIPTION

Representative embodiments and enhancements to earlier steady rests will now be described more fully with reference to the accompanying drawings.

Components of a Representative Steady Rest System

With reference to FIGS. 1-8B, in one embodiment, an adjustable steady rest system (hereinafter "steady rest") 10 is provided that is adapted to clamp and if desired, finely adjust the position of a workpiece during a machining operation (e.g., grinding or turning) by horizontal or vertical displacement or both horizontal and vertical displacement. In one embodiment, the steady rest 10 preferably includes a working cover plate 14, a right-hand cover plate 16 (from the perspective of FIG. 3A), and a central plate 18 that is slidingly positioned between them.

Figure 5A:
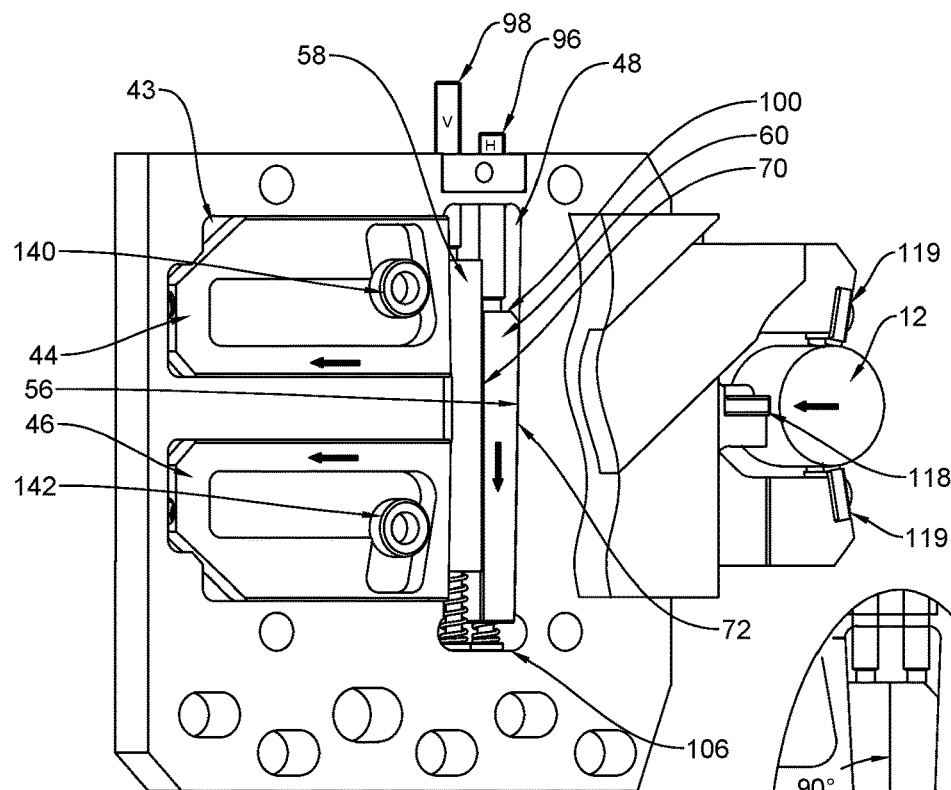
FIGS. 5A and 5B illustrate various components in horizontal adjustment modes.
Figure 5B:
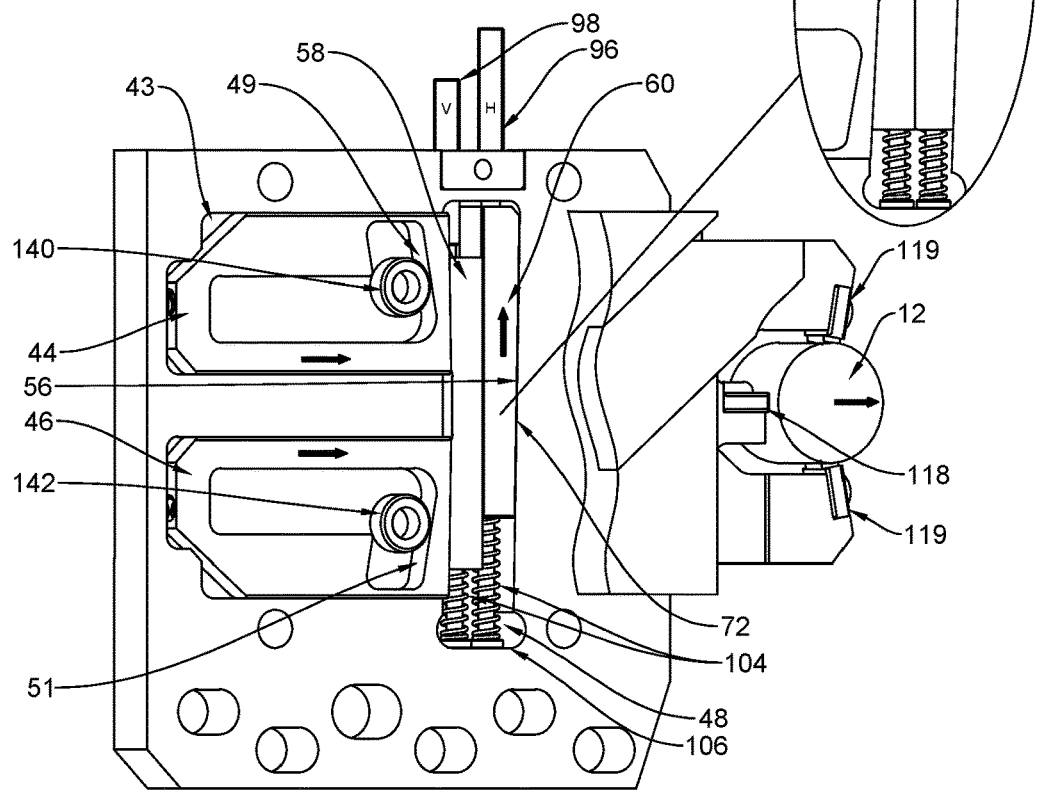
Figure 6:
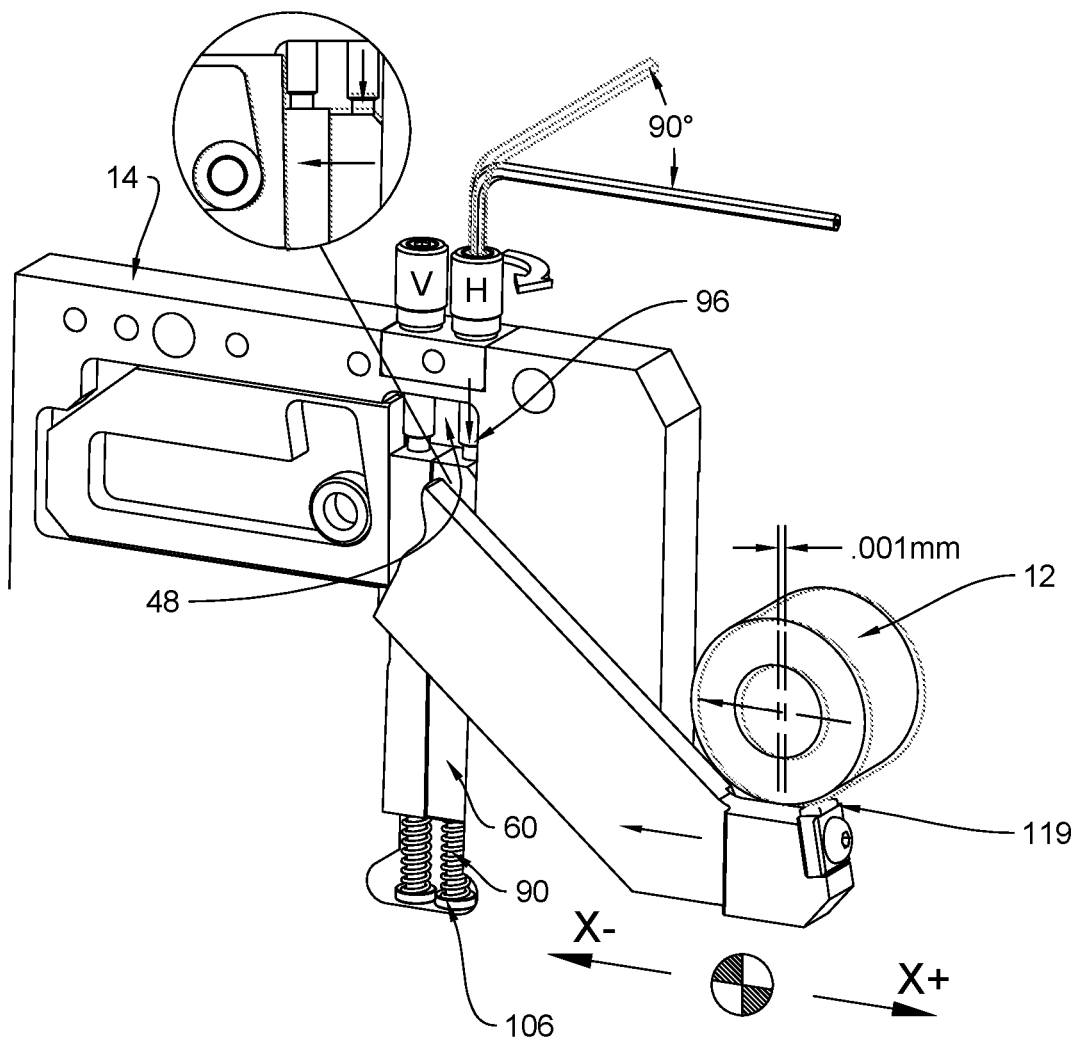
FIG. 6 further illustrates horizontal displacement of a clamped workpiece in response to turning an adjustment screw.

The steady rest 10 is adapted to cause gripping and displacement of the workpiece 12 vertically (FIGS. 4A, 4B and 7), or horizontally (FIGS. 5A, 5B and 6).

Upper and lower gripping arms 20, 22 (FIG. 1) and a cylinder/piston actuation mechanism 24 (FIG. 2) are provided. As will be described in more detail below, the actuation mechanism 24 is operable to move the central plate 18 and the gripping arms 20, 22 between a clamped position, in which the steady rest 10 grips the workpiece 12, and a retracted position, in which the workpiece 12 is released and the gripping arms 20, 22 are retracted into the steady rest 10.

Figure 1:
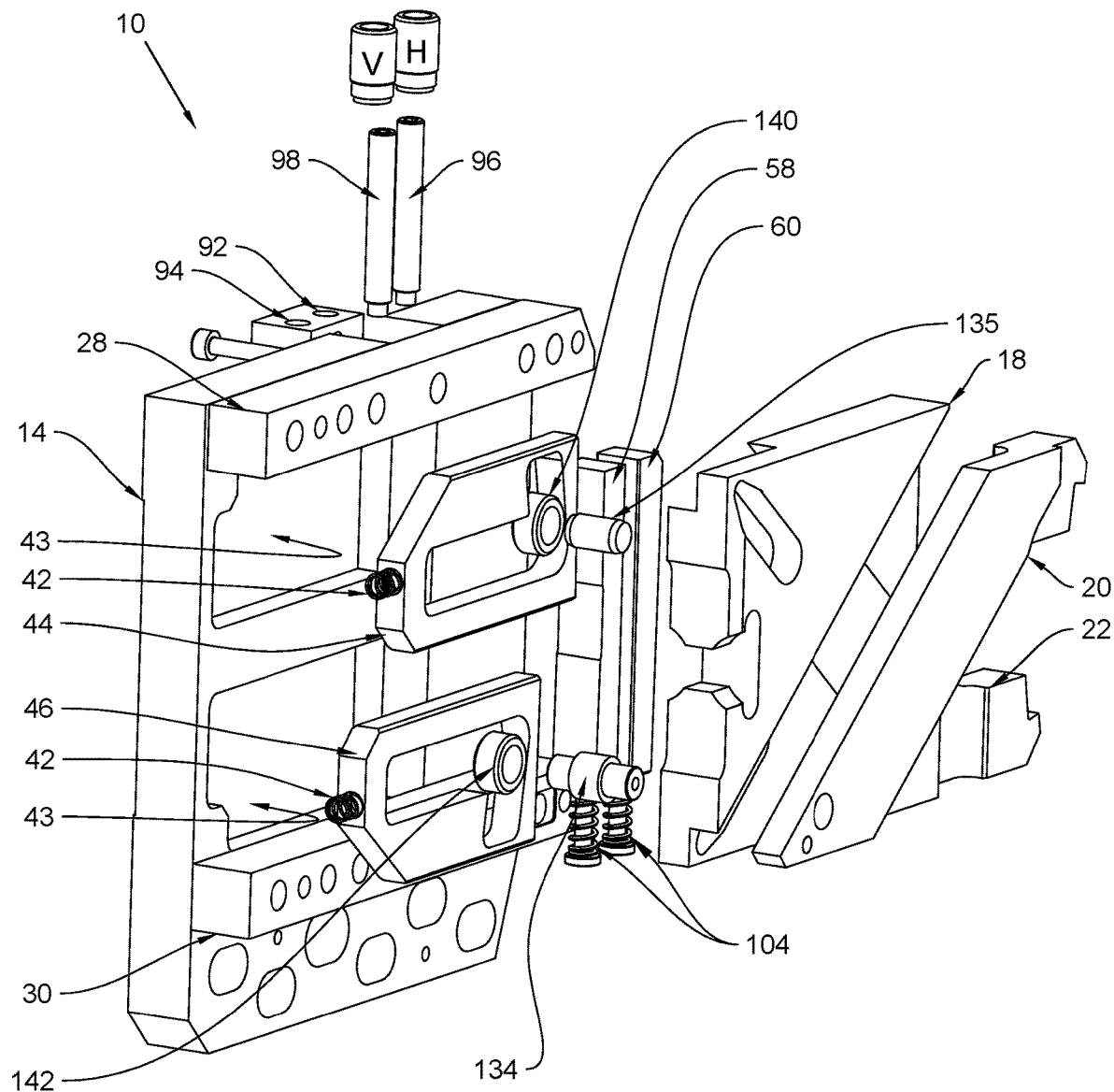
FIG. 1 is a perspective, exploded view of part of an adjustable steady rest system with a right-hand cover plate removed for clarity.
Figure 2:
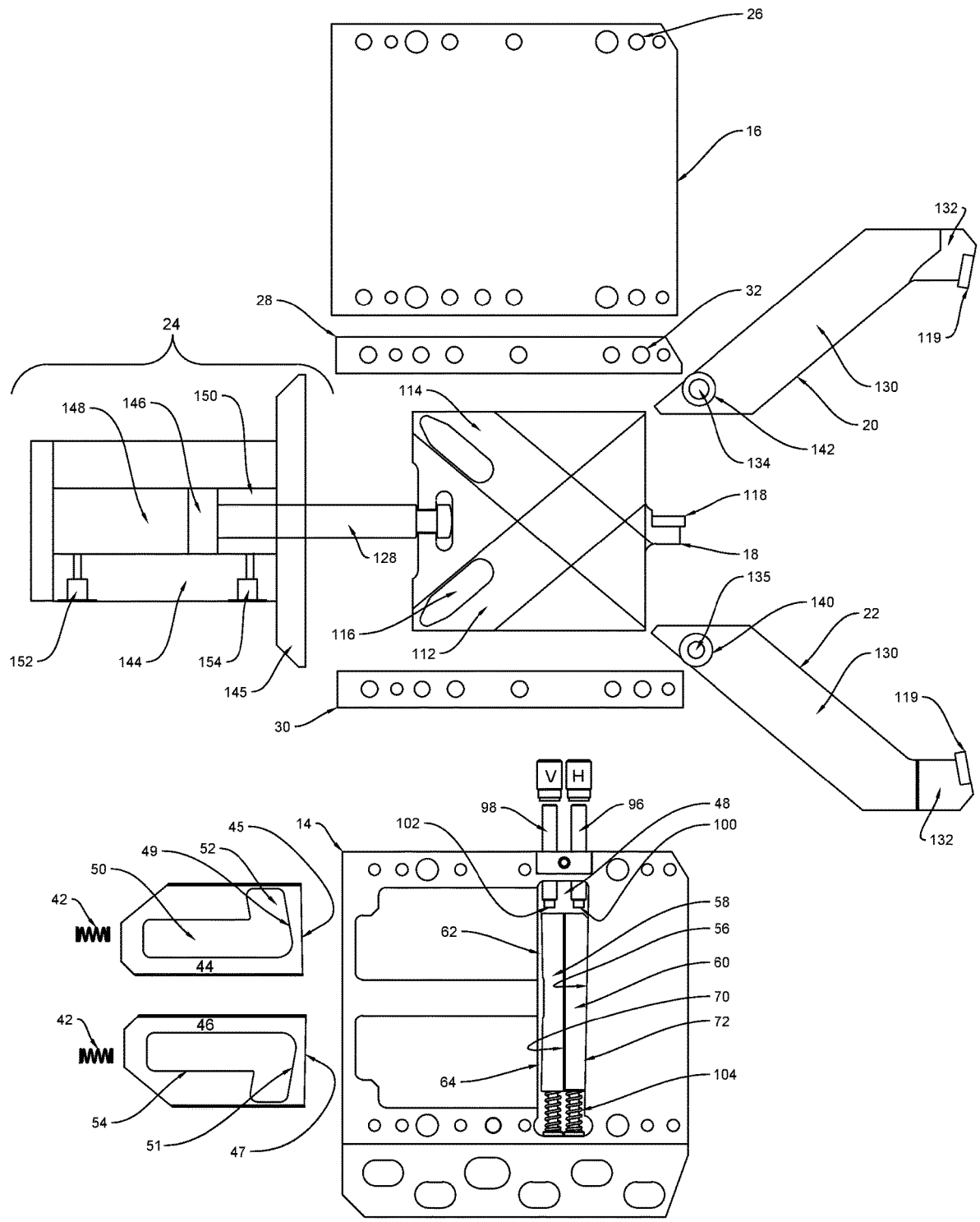
FIG. 2 is a laid-open, exploded view of the steady rest system.

As depicted in FIG. 2, the working cover plate 14 is a generally solid, flat plate having a plurality of threaded and unthreaded mounting apertures 32 (FIG. 2). Upper and lower slide plates 28, 30 (FIG. 1) are mounted (directly or indirectly) to the working cover plate 14. The central plate 18 is adapted to move between and be guided by slide plates 28, 30. The upper and lower slide plates 28, 30 include threaded and/or unthreaded apertures 32 aligned with the apertures 26 in the working cover plate 14.

Figure 3A:
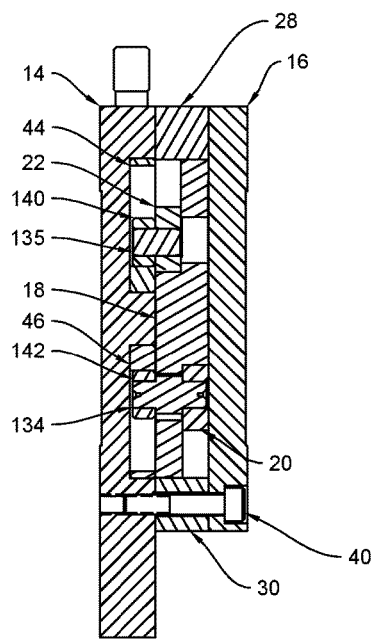
FIG. 3A is a vertical, sectional view of the steady rest system along the line B-B in FIG. 3B.

The right-hand cover plate 16 (FIG. 3A) has apertures that are aligned with the apertures 32 of slide plates 28, and 30 and with the apertures 26 of the working cover plate 14. Bolts 40 or other fasteners are received in some or all of the apertures to fixedly secure the working and right-hand cover plates 14, and 16 to each other and to slide plates 28, and 30. The central plate 18 is sandwiched there between (as shown in FIGS. 1 and 3) and is movable horizontally between the slide plates 28, 30.

The working and right-hand cover plates 14, 16 and slide plates 28, 30 cooperate to define cavities 43 in which guide tracks 44, and 46 are movably received. The guide tracks 44, 46 are adapted to move horizontally under the influence of fortified track engagement springs 42 (FIG. 1). Track engagement springs 42 are selected to withstand repeated compression and rebound. For ease of maintenance, such springs preferably conform with other springs to be discussed below.

As shown in FIGS. 1-2, the working cover plate 14 accommodates the upper and lower guide tracks 44, 46 that are received in the cavities 43 (FIG. 1). Each of the guide tracks 44, 46 preferably includes an elongated leg 50 and a relatively shorter leg 52 (FIG. 2). The legs 50 of the upper and lower guide tracks 44, 46 preferably extend parallel to each other and parallel to a longitudinal axis –X (FIG. 6). Each of the shorter legs 52 extends from an end of a corresponding one of the longer legs 50 in a direction that is laterally outward and away from the workpiece 12 (i.e., an acute angle is formed between the longer and shorter legs 50, 52).

To displace the gripping arms 20, 22 and thus a clamped workpiece 12 in precise, predictable and finely metered amounts, a number of components cooperate to displace a workpiece vertically (FIGS. 4A, 4B and 7) and horizontally (FIGS. 5A, 5B and 6).

Shaped rails 58, 60 (FIG. 1) respectively cooperate to finely displace a workpiece 12 vertically and horizontally with predictable precision in a manner to be described. These rails are slidingly movable within a rail recess 48 independently of each other (e.g., FIGS. 2-7). The vertical rail 58 has a flat face 70 (enlargement, FIG. 7) that abuts the horizontal rail 60 and an opposing face with inclined sections 62, 64 that meet on opposing sides of a flat middle section.

The working cover plate 14 has threaded apertures 92, 94 (FIG. 1) that extend preferably perpendicularly to the longitudinal axis X-X and communicate with the rail recess 48 (FIG. 2). Adjustment screws or rods 96, 98 (FIGS. 2, 6-7) threadedly engage the threaded apertures 92, 94, respectively, and extend into the rail recess 48. Preferably, about 100 threads per inch are provided to enable finely-tuned adjustments to be made. An end 102 of the upper or vertical adjustment rod 98 abuts an end of the rail 58 which ultimately adjusts the workpiece position minutely vertically ("vertical rail 58"). An end 100 of the lower or horizontal adjustment rod 96 abuts an end of the rail 60 (FIG. 5A), which ultimately finely tunes the workpiece position minutely horizontally ("horizontal rail" 60).

Akin to the track engagement springs associated with the upper and lower guide tracks 44, 46, rail engagement springs 104 (FIG. 2) are positioned between a lower wall 106 of the rail recess 48 and a corresponding one of the vertical and horizontal rails 58, 60 (FIGS. 4A, 4B, 5A and 5B). Preferably all engagement springs share common mechanical characteristics in order to facilitate maintenance and interchangeability. Common characteristics eliminate inventory problems associated with stocking differently-sized springs.

Rail engagement springs 104 (FIG. 4B) bias the rails 58, 60 into contact with the axial ends 100, 102 of the adjustment rods 96, 98. In this manner, the rails 58, 60 move toward and away from the lower wall 106 (in the directions shown in FIGS. 4-5) as the adjustment rods 96, 98 are moved along the threaded apertures 92, 94 into and out of the rail recess 48.

Threadedly adjusting the position of the horizontal adjustment rod 96 (FIGS. 5A, 5B and 6) causes the horizontal rail 60 to slide in relation to a wall of the rail recess 48. There is a relative angle (theta) between the wall and side 72 of the horizontal rail 60 (FIG. 5A and enlargement, FIG. 5B). Thus, a wedge-like effect is created in which movement of the horizontal rail 60 along wall 56 causes corresponding movement of the vertical rail 58 toward or away from the wall 56 in a direction along or parallel to the longitudinal X-axis.

Threadedly adjusting the position of the vertical adjustment rod 98 (FIGS. 4A, 4B and 7) causes the vertical rail 58 to slide in relation to the wall 70 of the horizontal rail 60. There is a relative angle (theta) between the walls 62, 64 of the vertical rail 58 and walls 45, 47 of the guide tracks 44, 46 (enlargement, FIG. 4B). Thus, movement of the vertical rail 58 along the wall 70 causes opposing movement of the guide tracks 44, 46 toward and away from the wall 70 in a direction along or parallel to the vertical Y-axis.

Cross channels 112, 114 (FIGS. 2, 3A and 3B) formed in the central plate 18 slidingly receive the gripping arms 20, 22. The upper channel 112 receives the upper arm 20. The lower channel 114 receives the lower arm 22. A slot 116 extends into the upper channel 112. A longitudinal axis of the slot 116 extends parallel to a longitudinal axis of the upper channel 112. Similarly for a slot provided in the lower channel 114. The upper and lower channels 112, 114 are angled relative to the longitudinal axes and to each other. The upper and lower channels 112, 114 cross each other to form a generally X-shaped pattern. The channels 112, 114 are configured so that the upper and lower gripping arms 20, 22 may move without interfering with each other.

Figure 3B:
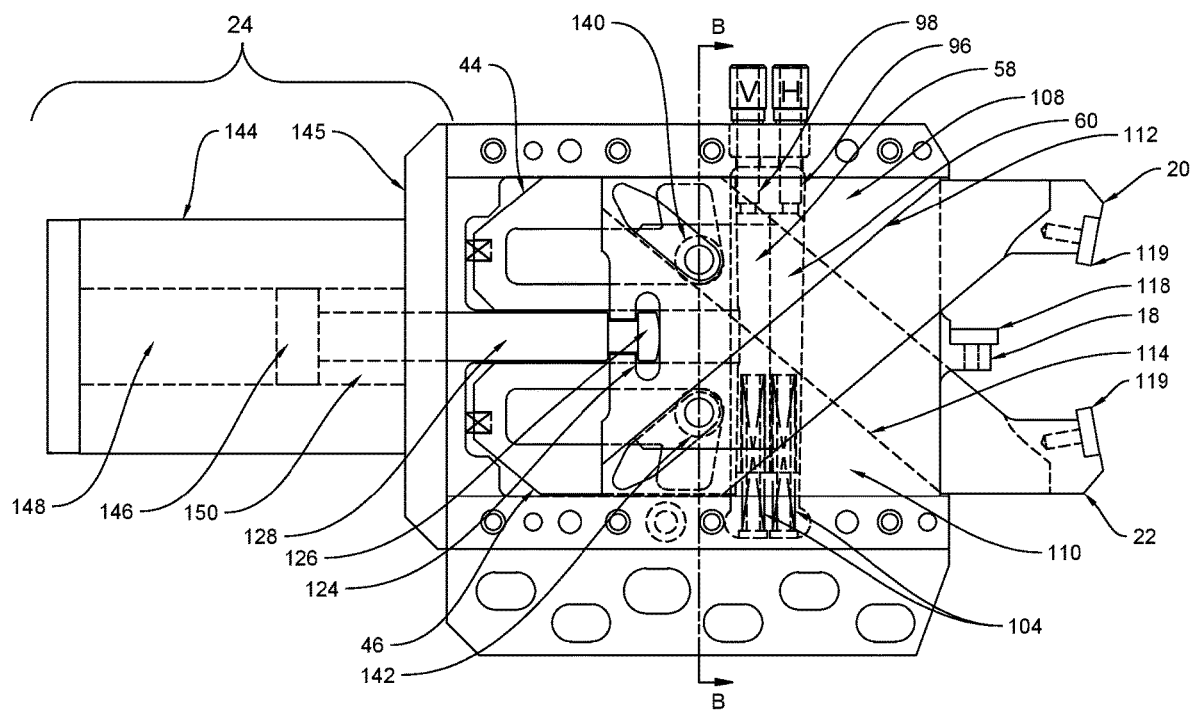
in FIG. 3B.
Figure 4A:
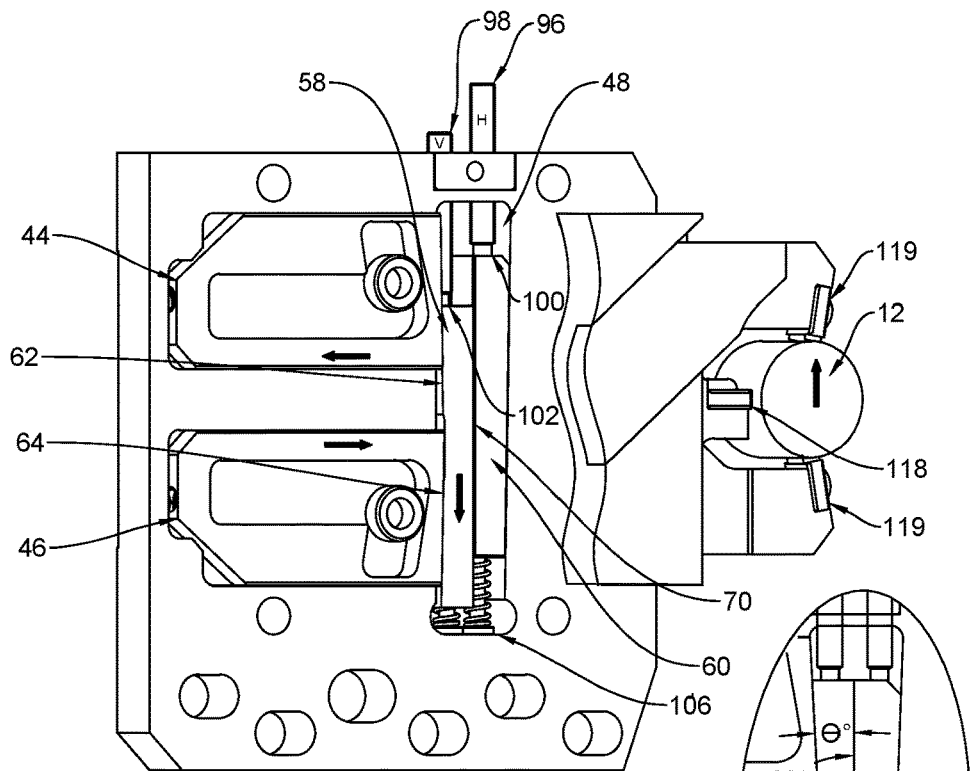
FIGS. 4A and 4B illustrate various components in vertical adjustment modes.
Figure 4B:
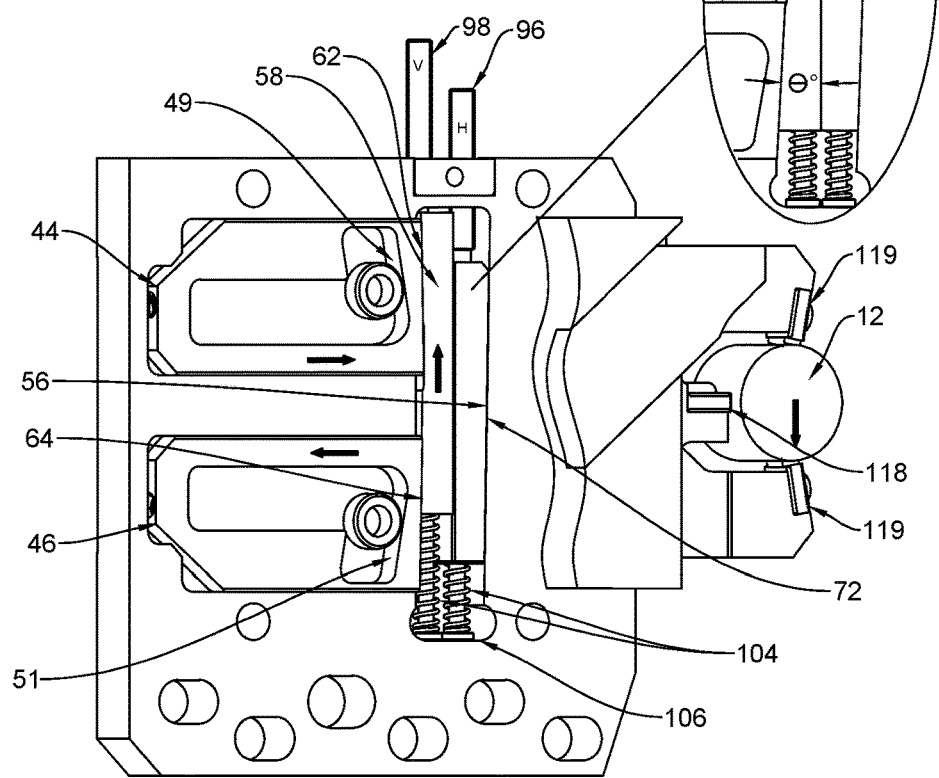

A gripping finger 118 extends from the central plate 18 between the upper and lower channels 112, 114 (FIG. 3B). The gripping finger 118 cooperates with gripping fingers 119 of the upper and lower gripping arms 20, 22 to grip and finely displace the workpiece 12 when the steady rest 10 is in the clamped position (FIGS. 4-7).

Another end of the central plate 18 has a generally T-shaped aperture 124. As shown in FIG. 3B, the T-shaped aperture 124 receives a similarly shaped end 126 of a ramrod 128 of the actuation mechanism 24.

Each of the upper and lower gripping arms 20, 22 is preferably provided with an elongated upper portion 130 and a relatively shorter lower portion 132 (FIG. 2). The upper and lower portions 130, 132 preferably are angled relative to each other. The gripping fingers 119 extend toward each other from the lower portions 130, 132.

The upper portions 130 of the gripping arms 20, 22 (FIG. 2) include pins or roller guides 134, 135 that protrude therefrom and extend into a corresponding one of the upper and lower guide tracks 44, 46. As shown in FIG. 2, pin 134 of the upper gripping arm 20 extends through slot 116 and into the lower guide track 46. In this way, an axial end of the pin 134 slidably engages the groove 54 of the lower guide track 46. Pin 135 of the lower gripping arm 22 extends into the upper guide track 44. An axial end of pin 135 slidably engages the groove 54 of the upper guide track 44. The pins 134, 135 have bushings 140, 142 that are slidably received in the lower and upper guide tracks 46, 44, respectively (FIG. 3B).

Turning now to FIGS. 2 and 3B, the actuation mechanism 24 includes a housing 144 with a chamber 148, a piston 146 and a ramrod 128. The housing 144 has a flange 145 that is bolted or otherwise mounted to the working cover plate 14 and/or the right-hand cover plate 16. The housing 144 and the piston 146 define fluid chambers 148, 150 in communication with upper and lower ports 152, 154, respectively (FIG. 2). The piston 146 is attached to the ramrod 128 and separates the fluid chambers 148, 150. Ports 152, 154 are in fluid communication with a source of working fluid (e.g., compressed air or preferably, hydraulic fluid). A fluid control device (not shown) is operable to control the flow of the working fluid in and out of ports 152, 154 (FIG. 2).

To move the piston 146 and ramrod 128 away from the workpiece 12, the control device causes working fluid to flow into the fluid chamber 150 while evacuating fluid from the other fluid chamber 148. To move the piston 146 and ramrod 128 toward the workpiece 12, the control device causes working fluid to flow into fluid chamber 148 while evacuating fluid from the chamber 150. Because the ramrod 128 is connected to the central plate 18, movement of the piston 146 and ramrod 128 toward and away from the workpiece 12 causes corresponding movement of the central plate 18 toward and away from the workpiece 12.

While the actuation mechanism 24 is described above as being a fluid-actuated device, it will be appreciated that any type of actuator could be used (e.g., an electric motor or another electromechanical device). Preferably the fluid is a liquid.

In conventional steady rests, threaded (tapped) holes are provided directly into the working and right-hand cover plates 14, 16. If the threads become damaged, the cover plates themselves often need to be replaced. Such an operation involves downtime and related cost. But with the steady rests systems disclosed herein, most repairs (if needed) are limited to the replacement of the horizontal and/or threaded adjustment rods 96, 98 and associated locking nuts, the brass block in which receiving apertures are defined, roller bearings or bushings 140, 142, and seals in the cylinder 24. Such steps are economically advantageous in comparison to prior approaches.

As described herein, the vertical threaded adjustment rod 98 lies on the left side (from the perspective of FIG. 1). In alternative embodiments, the vertical threaded adjustment rod 98 and related components may lie on the right side.

Operation of a Representative Steady Rest System (a) Clamping and Releasing the Workpiece With continued reference to FIGS. 1-7, the operation of a representative embodiment of a steady rest system 10 will now be discussed. As described above, the actuation mechanism 24 (FIG. 2) is adapted to move the central plate 18 and the gripping arms 20, 22 between a clamped position, in which the steady rest 10 grips the workpiece 12, and a retracted position, in which the workpiece 12 is released and the gripping arms 20, 22 are retracted into the steady rest 10.

The steady rest 10 can be finely, precisely, and predictably adjusted to move the position of the workpiece 12 relative to the steady rest 10 when the workpiece 12 is in the clamped position (see FIGS. 4-7). For example, a 90 degree turn of a vertical or horizontal adjustment rod 96, 98 can displace a gripped workpiece by 1 micron while holding the workpiece 12 in place, despite forces exerted by machining operations and by the spinning mass of the workpiece. Such precision was not possible in conventional steady rests.

To move the steady rest 10 from the retracted position to the clamped position, working fluid is injected into chamber 148 of the actuation mechanism 24, and working fluid (if present) is evacuated from chamber 150 (FIG. 2). This causes the piston 146 and the ramrod 128 to move toward the workpiece 12 (i.e., to the right relative to the frame of reference of FIG. 3B).

The central plate 18 moves with the ramrod 128 along the longitudinal X-axis relative to the working plate 14 and the right-hand plate 16 (FIG. 3A). As the central plate 18 and gripping arms 20, 22 move toward the clamped position, the pins 134, 135, and bushings 140, 142 slide along the legs 50 of the corresponding guide tracks 44, 46 (FIG. 3B). Continued movement of the ramrod 128 and central plate 18 along the longitudinal X-axis toward the workpiece 12 causes the bushings 140, 142 to come into contact with the surfaces 49, 51 respectively, of the guide tracks 44, 46 (FIG. 5B).

Preferably, the rails 58, 60 engage each other under the influence of a sliding interference fit. In one embodiment, there is about a 1-degree inclination of face 64 and surface 47 and face 62 and surface 45 (enlargement, FIG. 7). Correspondingly there is about a 1-degree inclination between face 56 and surface 72.

Once the bushings 142, 140 are in contact with the guide tracks 44, 46 and thus the surfaces 62, 64 (FIGS. 4A and 7) of the vertical rail 58, continued movement of the ramrod 128 and central plate 18 along the longitudinal X-axis toward the workpiece 12 causes the pins 134, 135 (FIGS. 1, 2) and bushings 140, 142 to slide laterally outwardly along the lower legs 52 of the guide tracks 44, 46. As the roller guides 134, 135 and bushings 140, 142 slide laterally outwardly along the lower legs 52 of the guide tracks 44, 46, the protruding ends (i.e., the lower portions 132) of the gripping arms 20, 22 move toward each other. The direction of movement of the protruding ends is in a direction perpendicular to the longitudinal X-axis. The gripping arms 20, 22 slide in the channels 112, 114, respectively, relative to the central plate 18 until the gripping fingers 119 of the gripping arms 20, 22 and the gripping finger 118 of the central plate 18 come into contact with and securely clamp the workpiece 12.

To move the steady rest 10 from the clamped position to the retracted position (FIG. 7), working fluid is injected into chamber 150 of the actuation mechanism 24, and working fluid (if present) is evacuated from the other chamber 148. This causes the piston 146, the ramrod 128, and the central plate 18 to move relative to the working and right-hand cover plates 14, 16 away from the workpiece 12 after releasing it. Such movement reverses the movement of the gripping arms 20, 22 described above.

(b) Displacing the Workpiece Horizontally and Vertically

Turning now to FIGS. 4-7, the adjustment rods (fine screws, with about 100 threads per inch) 96, 98 can be turned to finely shift the position in which the clamped workpiece 12 will be moved by the gripping fingers 118, 119.

As shown in FIG. 6, to move the workpiece 12 horizontally toward the working and right-hand cover plates 14, 16, the user rotates the horizontal adjustment rod 96 in a direction that causes movement of the horizontal rail 60. Such movement occurs within recess 48 in a direction perpendicular to the longitudinal X-axis. Rail engagement springs 90 urge the rails 96, 98 upwardly.

There is a fine angle of inclination (theta, about 0.92 to 1.08 degrees, preferably 1.00 degree) between the horizontal rail 60 and the wall of recess 48. As a result, a wedge effect is created that influences and constrains movement of the guide tracks 44, 46 that abut the rail 58.

By moving the horizontal guide rail 60 upwardly under the influence of an associated rail engagement spring 90 (FIGS. 5B, 6), the position along the guide tracks 44, 46 at which the bushings 140, 142 contact the guide tracks 44, 46 also moves outwardly.

Figure 7:
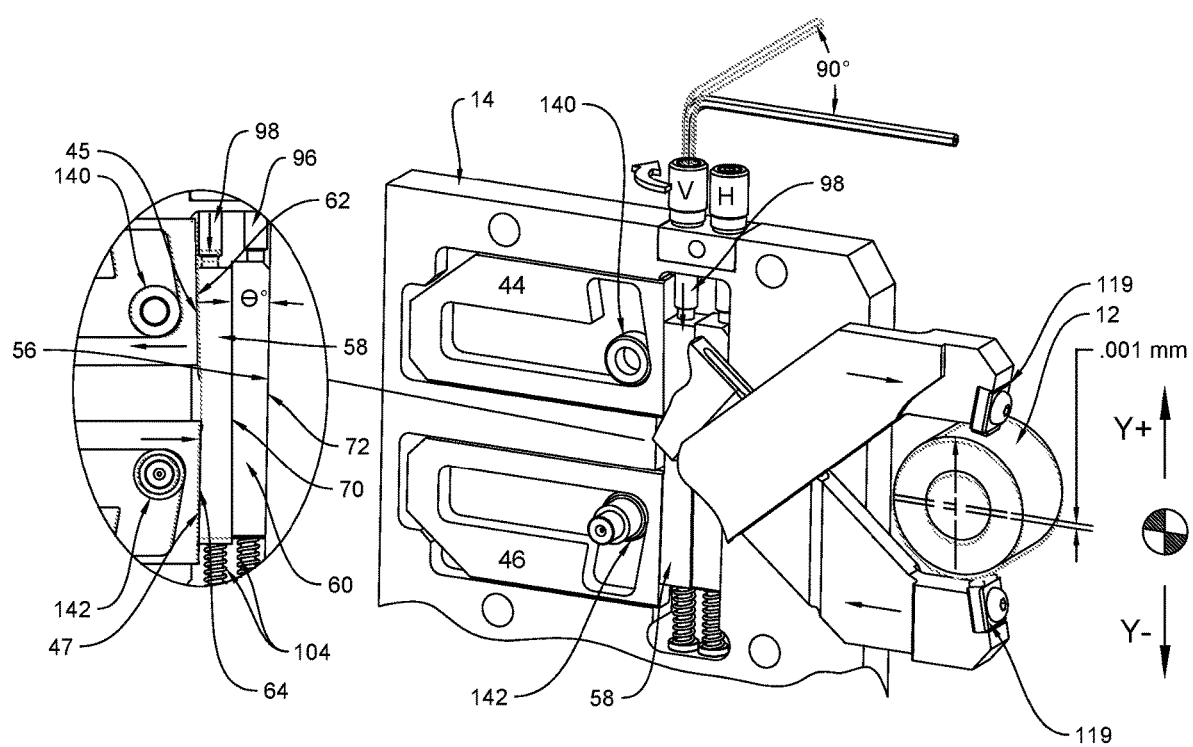
FIG. 7 further illustrates vertical displacement of a clamped workpiece in response to turning another adjustment screw.

FIGS. 6-7 schematically illustrate how the rotation of one or both adjustment screws 96, 98 move a clamped workpiece inwardly or outwardly (FIG. 6) and/or upwardly and downwardly (FIG. 7).

For example, to move the position in which the gripping fingers 118, 119 precisely move the workpiece 12 in a vertical direction, the user rotates the adjustment rod 98. In one case, a clockwise displacement of 90 degrees raises the workpiece 12 by 1 micron. Conversely, counterclockwise displacement lowers the workpiece by a corresponding amount.

It will be appreciated that intermediate adjustments may be made, and that displacement is not limited to 90-degree increments or decrements.

The steady rest 10 may be used to hold the workpiece 12 for a grinding operation. It will be appreciated, however, that the principles of the present disclosure may be applicable to steady rests configured for turning operations and/or other machining or manufacturing operations.

Figure 8A:
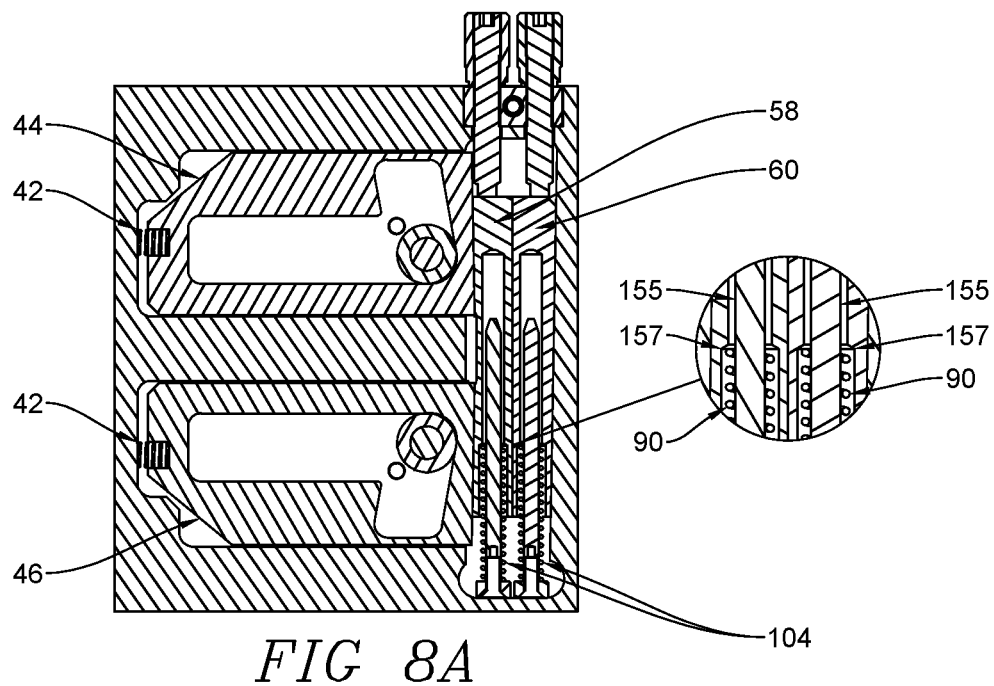
FIG. 8A is an earlier steady rest design.
Figure 8B:
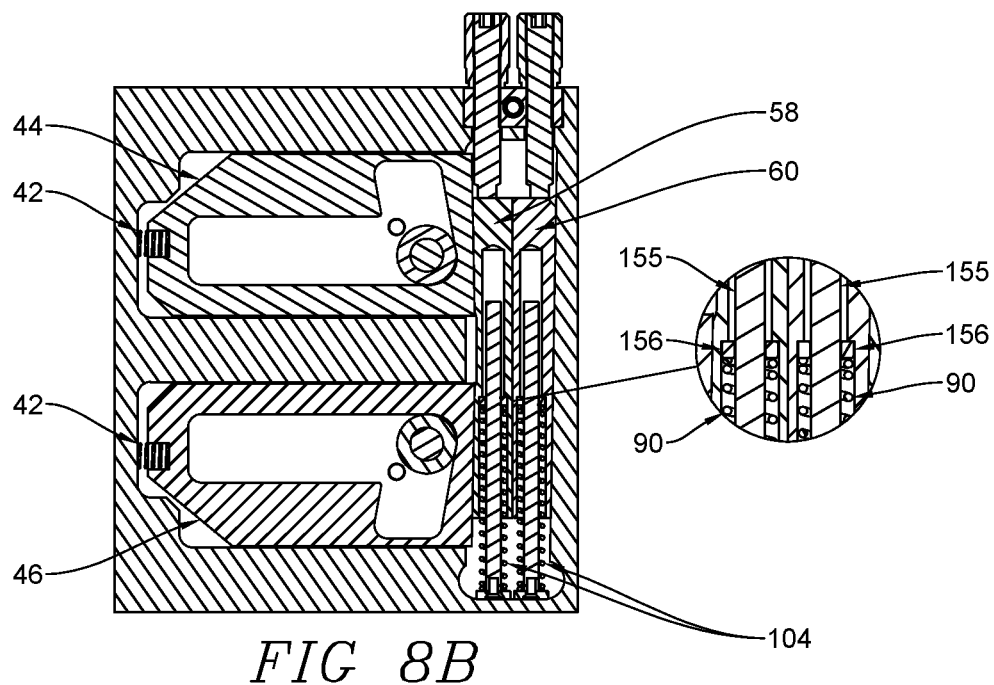
FIG. 8B is its revision.

FIGS. 8A-8B depict enhancements to an earlier design that was described in the parent patent application. FIG. 8A is the original design and FIG. 8B is its revision. In FIG. 8A the relationship between the rail pin 155 and vertical rail 58 or horizontal rail 60 would allow a condition in which the rail engagement spring 90 could become seized in the rail spring pocket 157. To solve this condition, a rail washer 156 was added (FIG. 8B). This eliminated the rail spring pocket 157 and changed the relationship between the rail pin 155 and vertical rail 58 or horizontal rail 60. Additionally, springs 104 are now characterized by a higher spring force.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

REFERENCE LIST

10 Steady rest system
12 Workpiece
14 Working cover plate
16 Right-hand cover plate
18 Central plate
20 Upper gripping arm
22 Lower gripping arm
24 Actuation mechanism
26 Apertures
28 Upper slide plate
30 Lower slide plate
32 Aperture
40 Bolt
42 Track engagement spring
43 Cavity
44 Upper guide track
45 Side wall of upper track
46 Lower guide track
47 Side wall of lower track
48 Rail recess
49 Inner wall of upper guide track
50 Elongated upper leg
51 Inner wall of lower guide track
52 Shorter lower leg
54 Groove
56 Upper wall
58 Vertical rail
60 Horizontal rail
62 Upper side of vertical rail 64 Lower side of vertical rail
70 Upper side of horizontal rail
72 Lower side of horizontal rail
90 Rail engagement spring
92 Threaded aperture
94 Threaded aperture
96 Horizontal threaded adjustment rod
98 Vertical threaded adjustment rod
100 Axial end of 96
102 Axial end of 98
104 Rail engagement springs
106 Second wall of 48
108 First side of 18
110 Second side of 18
112 Upper cross channel
114 Lower cross channel
116 Slot
118 Gripping finger
119 Gripping finger arm
124 T-shaped aperture
126 T-shaped end of 128
128 Ramrod of 24
130 Elongated first portion of gripping arms
132 Shorter second portion of griping arms
134 Pin
135 Pin
140 Bushing
142 Bushing
144 Housing
145 Flange
146 Piston
148 First fluid chamber
150 Second fluid chamber
152 Port
154 Port
155 Rail Pin
156 Rail Washer
157 Rail Spring Pocket

What is claimed is:

1. A steady rest for gripping and finely positioning a workpiece, the steady rest comprising:
    a working cover plate and a right-hand cover plate,
    a central plate disposed between the working and right-hand cover plates, the central plate being adapted to move slidably therebetween, the central plate having an upper and a lower cross-channel for engaging upper and lower gripping arms, the gripping arms being movable relative to the working and right-hand cover plates between a clamped position and a retracted position, the working cover plate also having a rail recess and a pair of cavities that respectively receive upper and lower guide tracks and track engagement springs that bias the guide tracks within cavities;
    a tapered horizontal rail situated in the rail recess, the tapered horizontal rail being adapted to cause displacement of the workpiece horizontally;
    a vertical rail with a flat face that abuts the horizontal rail and an opposing face with inclined sections that meet on opposing sides of a flat middle section, the vertical rail being adapted to move the workpiece vertically, the vertical rail also being received in the rail recess,
    the horizontal and vertical rails contacting the rail recess and each other while controlling location of the gripping arms, the horizontal and vertical rails being movable relative to each other under the guidance of rail pins that extend along channels defined within the horizontal and vertical rails and rail washers to avoid binding and to adjust a position relative to the working and right-hand cover plates at which the workpiece will be clamped when the upper and lower gripping arms are in the clamped position.

2. The steady rest of claim 1, further comprising horizontal and vertical threaded adjustment rods threadedly received in apertures of the working cover plate and extending into the rail recess, the horizontal threaded adjustment rod abutting the horizontal rail and being rotatable to adjust a position of the horizontal rail, the vertical threaded adjustment rod abutting the vertical rail and being rotatable to adjust a position of the vertical rail.

3. The steady rest of claim 2, further comprising rail engagement springs for biasing the horizontal and vertical rails into contact with an upper wall of the rail recess, the track engagement springs and the rail engagement springs having common mechanical properties.

4. The steady rest of claim 1, wherein the inclined sections of the vertical rail have faces that are inclined to the flat face by an angle theta, where theta lies between 0.92 and 1.08 degrees.

5. The steady rest of claim 1, wherein the horizontal rail includes a flat side that slidingly engages the vertical rail and an opposing side that slidingly engages a wall of the rail recess, wherein the flat side and the wall are inclined by an angle theta, where theta lies between 0.92 and 1.08 degrees.

6. The steady rest of claim 1, wherein the upper and lower gripping arms include pins extending therefrom that are slidably received in the upper and lower guide tracks.

7. The steady rest of claim 6, wherein the upper and lower guide tracks each have an elongated leg and a shorter leg extending therefrom.

8. The steady rest of claim 1, further including an actuation mechanism with a housing having fluid chambers, a piston positioned between the chambers and a ramrod, the housing being secured to the working cover plate and/or the right-hand cover plate.

9. The steady rest of claim 8, wherein the housing and the piston define fluid chambers in communication with upper and lower ports respectively, the ports being in fluid communication with a source of working fluid and a fluid control device that is operable to control a flow of the working fluid in and out of the ports.

10. The steady rest of claim 1, wherein a 90 degree turn of a vertical or horizontal adjustment rod displaces the workpiece by 1 micron while holding the workpiece in place, despite forces exerted by machining operations and by the spinning mass of the workpiece.

11. A method of moving the steady rest of claim 1 from the retracted position to the clamped position, comprising the steps of
    injecting a working fluid into a chamber of an actuation mechanism, thereby causing a piston to move toward the workpiece;
    moving the central plate under the influence of the actuation mechanism along an axis relative to the working plate and the right-hand plate;
    as the central plate and gripping arms move toward the clamped position, sliding pins and bushings along legs of corresponding guide tracks so that the bushings come into contact with surfaces of the guide tracks and so that the pins and bushings slide laterally outwardly along lower legs of the guide tracks, protruding ends of the gripping arms thereby moving toward each other to come into contact with and securely clamp the workpiece.

12. A method of moving a clamped workpiece horizontally using the steady rest of claim 1, comprising the steps of rotating a horizontal adjustment rod with a horizontal adjustment screw in a direction that causes movement of the horizontal rail under the influence of a rail engagement spring, such movement occurring under the constraint of an angle of inclination (theta, 0.92 to 1.08 degrees) between the horizontal rail and a wall of the rail recess so that a wedge effect influences and constrains movement of the guide tracks; and moving the horizontal guide rail upwardly under the influence of the rail engagement spring so that a position along the guide tracks at which bushings contact the guide tracks also moves outwardly, thereby displacing the workpiece horizontally, so that rotation of the horizontal adjustment screw moves a clamped workpiece inwardly or outwardly.

13. A method of moving a clamped workpiece vertically using the steady rest of claim 1, comprising the steps of rotating a vertical adjustment screw in a direction that causes movement of the vertical rail, such movement occurring under the constraint of an angle of inclination (theta, 0.92 to 1.08 degrees) between the vertical rail and a wall of the rail recess so that a wedge effect influences and constrains movement of the guide tracks; and moving the vertical rail upwardly so that a position along the guide tracks at which bushings contact the guide tracks also moves vertically, thereby displacing the workpiece vertically.

\* \* \* \* \*